(12) United States Patent
Elija et al.

(10) Patent No.: US 10,246,040 B2
(45) Date of Patent: Apr. 2, 2019

(54) AIR BAG MODULE

(71) Applicant: TRW AUTOMOTIVE GMBH, Alfdorf (DE)

(72) Inventors: Daniel Elija, Schwäbisch Gmünd (DE); Werner Freisler, Heubach (DE); Sven Tamme, Alfdorf (DE)

(73) Assignee: TRW AUTOMOTIVE GmbH (DE)

( * ) Notice: Subject to any disclaimer, the term of this patent is extended or adjusted under 35 U.S.C. 154(b) by 0 days.

(21) Appl. No.: 15/317,537

(22) PCT Filed: Jun. 19, 2015

(86) PCT No.: PCT/EP2015/001241
§ 371 (c)(1),
(2) Date: Dec. 9, 2016

(87) PCT Pub. No.: WO2015/197182
PCT Pub. Date: Dec. 30, 2015

(65) Prior Publication Data
US 2017/0129443 A1 May 11, 2017

(30) Foreign Application Priority Data

Jun. 23, 2014 (DE) .......... 10 2014 008 973

(51) Int. Cl.
| | |
|---|---|
| *B60R 21/215* | (2011.01) |
| *B60R 21/217* | (2011.01) |
| *B60R 21/203* | (2006.01) |
| *B60R 21/205* | (2011.01) |
| *B60R 21/206* | (2011.01) |

(Continued)

(52) U.S. Cl.
CPC ........ *B60R 21/215* (2013.01); *B60R 21/2176* (2013.01); *B60R 21/205* (2013.01); *B60R 21/206* (2013.01); *B60R 21/207* (2013.01); *B60R 21/2035* (2013.01); *B60R 21/21* (2013.01); *B60R 21/213* (2013.01); *B60R 2021/0006* (2013.01); *B60R 2021/2172* (2013.01); *B60R 2021/21506* (2013.01);
(Continued)

(58) Field of Classification Search
CPC .............. B60R 21/215; B60R 21/2176; B60R 2021/23169; B60R 2021/23146; B60R 2021/21506; B60R 21/213; B60R 2021/0006; B60R 21/207; B60R 21/206; B60R 21/205; B60R 21/2035; B60R 21/21; B60Y 2410/124
See application file for complete search history.

(56) References Cited

U.S. PATENT DOCUMENTS

| | | | | |
|---|---|---|---|---|
| 5,498,025 A | * | 3/1996 | Easter | ................. B60R 21/205 280/728.2 |
| 8,419,048 B2 | * | 4/2013 | Yamaji | ................. B60R 21/201 280/728.3 |

(Continued)

*Primary Examiner* — Darlene P Condra
(74) *Attorney, Agent, or Firm* — Tarolli, Sundheim, Covell & Tummino LLP (57) ABSTRACT

The invention relates to an airbag module comprising a housing (14) for an airbag (16) and a cover (12), the housing including a fabric part (14) which at least partly encloses the airbag (16), characterized in that means (20; 30; 60) for fastening the housing (14) which are formed integrally with the cover (12) are provided and in that the fabric part (14) is arranged directly on the fastening means (20; 30; 60).

18 Claims, 8 Drawing Sheets

(51) Int. Cl.
 *B60R 21/207* (2006.01)
 *B60R 21/21* (2011.01)
 *B60R 21/213* (2011.01)
 *B60R 21/00* (2006.01)
 *B60R 21/231* (2011.01)

(52) U.S. Cl.
 CPC ............ *B60R 2021/23146* (2013.01); *B60R 2021/23169* (2013.01); *B60Y 2410/124* (2013.01)

(56) References Cited

U.S. PATENT DOCUMENTS

| | | | |
|---|---|---|---|
| 9,517,745 B1* | 12/2016 | Keyser | B60R 21/217 |
| 2003/0178818 A1* | 9/2003 | Schneider | B60R 21/2165 |
| | | | 280/728.3 |
| 2006/0220355 A1* | 10/2006 | Yokoyama | B60R 21/205 |
| | | | 280/728.3 |
| 2007/0007753 A1* | 1/2007 | Williams | B60R 21/217 |
| | | | 280/728.2 |
| 2011/0210534 A1* | 9/2011 | Sauer | B60R 21/2035 |
| | | | 280/728.2 |
| 2012/0018990 A1* | 1/2012 | Schneider | B60R 21/239 |
| | | | 280/739 |
| 2016/0016528 A1* | 1/2016 | Schmid | B60R 21/2176 |
| | | | 280/728.2 |

\* cited by examiner

AIR BAG MODULE

RELATED APPLICATIONS

This application corresponds to PCT/EP2015/003549, filed Jun. 19, 2015, which claims the benefit of German Application No. 10 2014 008 973.8, filed Jun. 23, 2014, the subject matter of which are incorporated herein by reference in their entirely.

BACKGROUND OF THE INVENTION

The invention relates to an airbag module comprising a flexible housing and a cover.

The airbag module is part of a vehicle occupant restraint system (coll. referred to as "airbag") which is used to protect the vehicle occupant in particular vehicle situations. The vehicle occupant restraint system comprises, to simplify matters, a controller, an inflator and an airbag. The controller decides whether a situation is given in which the inflator is activated. The latter then inflates the airbag.

In the initial state the airbag is arranged in compactly folded form in a housing. The housing is arranged on or in the vicinity of a cover which may have different designs depending on the respective mounting situation and the type of airbag. When a driver airbag is concerned, the cover is a component which is arranged on the steering wheel hub. When a passenger airbag is concerned, the cover is part of the instrument panel. When a side airbag is concerned which is intended to be active in the case of side impact, the cover may be part of the vehicle seat or else part of the inner lining of the vehicle. When a knee airbag is concerned, the cover is a separate part which is arranged in a recess either in the lower portion of an instrument panel or in a lining part in the foot space of the vehicle.

While initially solid parts were used for the housing of the airbag, for example a sheet-metal trough, meanwhile also housings are known which are formed by an appropriately cut fabric part. Examples hereof are found in U.S. Pat. No. 7,530,500 B2.

A fabric housing offers the advantage that it is very light. Nevertheless, it is adapted to absorb the reaction forces occurring upon deployment of the airbag and to form the so called channel of ascent, i.e. to guide the airbag out of the housing during deployment.

With respect to a reliable function it is essential that the fabric part forming the airbag housing is tightly attached to the cover so that the forces occurring during deployment of the airbag which attempt to separate the housing from the cover can be reliably absorbed. At the same time it is desirable with respect to the mounting operation that the housing can be arranged on the cover with little effort.

It is known from the afore-mentioned U.S. Pat. No. 7,530,599 B2 to arrange the fabric housing on a frame which in turn can be arranged on the cover. This results in a comparatively complicated structure.

SUMMARY OF THE INVENTION

The object of the invention consists in providing an airbag module which excels by a simple structure and a reliable mounting of the fabric housing.

For achieving this object, according to the invention an airbag module comprising a housing for an airbag and a cover is provided, wherein the housing includes a fabric part which at least partly encloses the airbag, characterized in that means formed integrally with the cover are provided for fastening the housing and that the fabric part is arranged directly on said fastening means. The airbag module according to the invention is based on the basic idea to save intermediate elements which have been used for mounting the housing in the previous state of the art. Instead, the fabric part forming the substantial part of the housing for the airbag is arranged directly on the cover. For this purpose, the cover is provided with appropriately configured fastening means adapted to be provided on the cover without any major effort, however.

According to an embodiment of the invention the fastening means are provided to be a plurality of hooks into which the fabric part is hooked. Said hooks can be easily provided on the cover, especially when the cover is an injection molded part. The forces acting on the fabric part are transferred directly into the cover via the hooks.

According to an embodiment, the hooks are provided to project perpendicularly from the plane of the cover. This facilitates threading of the fabric part onto the hooks.

According to a preferred configuration, at least one locking element is provided which is attached to the hooks so that the fabric part is located between the cover and the locking element. The locking element enables the fabric part to be reliably fixed to the hooks with little effort so that it cannot detach from the latter any more.

According to an embodiment, the locking element is provided as a separate component which is attached to the hooks. It may be manufactured. If required, of a material other than the material of which the cover is made.

Alternatively, it may be provided that the locking element is formed integrally with the cover. This results in a reduction of the mounting effort as the locking element need not be separately manufactured and kept ready during assembly.

It is especially preferred for a locking element formed integrally with the cover that it is connected to the cover by a pivoting portion. Then it is sufficient during assembly to swivel or press down the locking element about the pivoting portion from the initial or mounting position into the locking position.

According to an embodiment of the invention, it is provided that the locking element is a strip interacting with a plurality of hooks. Herefrom the advantage is resulting that one single component has to be mounted which will simultaneously fasten the fabric part to a plurality of hooks. Moreover there is the option to design the strip with an especially stiff cross-section and/or of an especially tight material so that it acts as a reinforcement of the cover.

There may be provided a counter-bearing that is arranged on the cover adjacent to the locking element. Said counter-bearing improves the fixation of the fabric part between the hooks and the locking element.

According to an embodiment of the invention, the locking element is provided to be arranged on the inside of the housing. This configuration offers itself in an especially constricted space.

According to another embodiment, it is provided that the looking element is arranged on the outside of the housing. This offers advantages as regards easier mountability.

In accordance with an embodiment of the invention it is provided that the fastening means include plural openings through which the fabric part extends with fastening portions and that a looking element which prevents the fastening portions from being withdrawn from the openings is provided on the fastening portions. Generally speaking, by means of the locking elements a "thickening" ensuring that the fabric part cannot be withdrawn from the openings and thus is reliably fixed there is produced at an appropriate position on the fabric part.

According to an embodiment of the invention, the openings are provided to be formed in a fastening strip which is provided on the cover. Such fastening strip can be integrally formed on the cover with little effort and enables the openings to be designed in an especially simple manner.

Preferably the fastening strip is provided to extend perpendicularly to the plane of the cover. This is of particular advantage in the case of injection molded parts.

An embodiment of the invention provides that the openings are in the form of slits. Basically small openings are advantageous as, on the one hand, they require only small locking elements to prevent the fabric part from being withdrawn from the openings, and, on the other hand, small openings also cause only minimum weakening of the fastening strip.

According to an embodiment of the invention, the fastening portions are provided to be configured as eyes extending through the openings and the locking element is provided to be arranged in the respective eye. In this configuration, the looking element can be easily pushed through the eye after the latter has been put through the opening.

Preferably, the locking element is provided to extend through a plurality of eyes. This reduces the mounting effort as only few looking elements have to be attached. When, according to an especially preferred embodiment, the locking element extends over a total side of the housing, merely one single locking element has to be used for each housing side.

The locking element can be designed especially in the form of a rod which is made of wire or of plastic material, for example. Such locking element excels by very low costs.

Preferably the locking element is arranged on the side of the respective opening facing away from the housing. Thus mounting is facilitated.

According to an embodiment of the invention, it is provided that the distance between two neighboring eyes is larger than the width of the eyes, especially amounts to more than twice the width of the eyes. In this way between two neighboring openings sufficient material is retained to ensure the desired strength.

According to an embodiment of the invention, the locking element is provided to be formed by a tissue part. In this manner the required thickening ensuring that the fabric part cannot be withdrawn from the openings can be obtained at low cost.

According to an embodiment of the invention, the fabric part is provided to be a stitched-down part of the fastening portion. This configuration offers the advantage that no separate fabric part has to be supplied during mounting.

According to an alternative configuration, the fabric part is provided to be a separate stitched-on fabric part. This configuration excels by less manufacturing effort as the folding of part of the fastening portion is omitted.

Preferably the seam by which the fabric part is arranged on the fastening portion is designed to be exposed on the side of the fastening means. This offers advantages when fastening the fabric part to the cover, as the seam can be easily produced.

According to an embodiment of the invention, it is provided to configure the fastening means as a strip and to sew up the fabric part with the strip. In other words, the fabric part is simply stitched on the cover. This step excels by little manufacturing effort.

According to an embodiment of the invention, the fastening means is provided to be formed as a strip including dome-shaped extensions onto which the fabric part is threaded. The dome-shaped extensions are widened after threading the fabric part at the end side in the form of welding domes, e.g. mushroom-shaped. This facilitates the manufacture with the completed module, i.e. after inserting the airbag, as in this case only one side of the strip has to be accessed with tools. The widening of the dome-shaped extensions is not necessarily mushroom-shaped, of course; a flat or differently shaped widening which is suited for preventing the threaded fabric part from inadvertently detaching form the fastening means is also sufficient.

Especially advantageous is a design in which the connection between the fabric part and the fastening means on one side is established by sewing and on another side is established via welding domes. In this case sewing may be carried out prior to inserting the airbag and thus in an easily accessible manner, and threading onto the extensions (welding domes) and subsequent reforming may be carried out after completely equipping the module with the inflator and the airbag.

It is preferably provided for the strip to extend continuously along one side of the housing. This enables one side of the fabric part to be fastened on the cover by means of one single continuous seam and thus at very low cost.

In this context, it is outlined that it is considered to be a special aspect of the invention to connect the fabric part to the cover by means of a seam either by forming via the seam a thickening which mechanically fixes the fabric part in an opening on the cover or by sewing up the fabric part directly with the cover. In both cases the concept according to the invention is based on the finding that although forming a seam in direct vicinity to the cover or on the cover itself entails an increased effort, such effort is more than compensated, however, by the fact that expensive fastening mechanisms can be dispensed with.

According to another embodiment of the invention, it is provided for the fastening means to be configured as a bearing portion into which the fabric part is molded. In this embodiment, after manufacture no separate step is required for fastening the fabric part to the cover.

According to a further development of the invention, the fastening means are provided to be manufactured separately from the cover and to be subsequently connected to the latter. Although it is basically preferred to form the fastening means integrally with the cover, i.e. in one piece and without any separating plane of the same material, the afore-described types of fastening the fabric part to the cover may be realized also by the fact that the fastening means are manufactured separately and are arranged on the cover, for example are glued, welded, riveted, screwed or similarly tightly connected to the same, so that as a result a fastening comparable to an integral design as regards its strength and characteristics is obtained.

BRIEF DESCRIPTION OF THE DRAWINGS

Hereinafter the invention shall be described by way of different embodiments which are shown in the enclosed drawings, and in which.

DESCRIPTION

Figure 1:
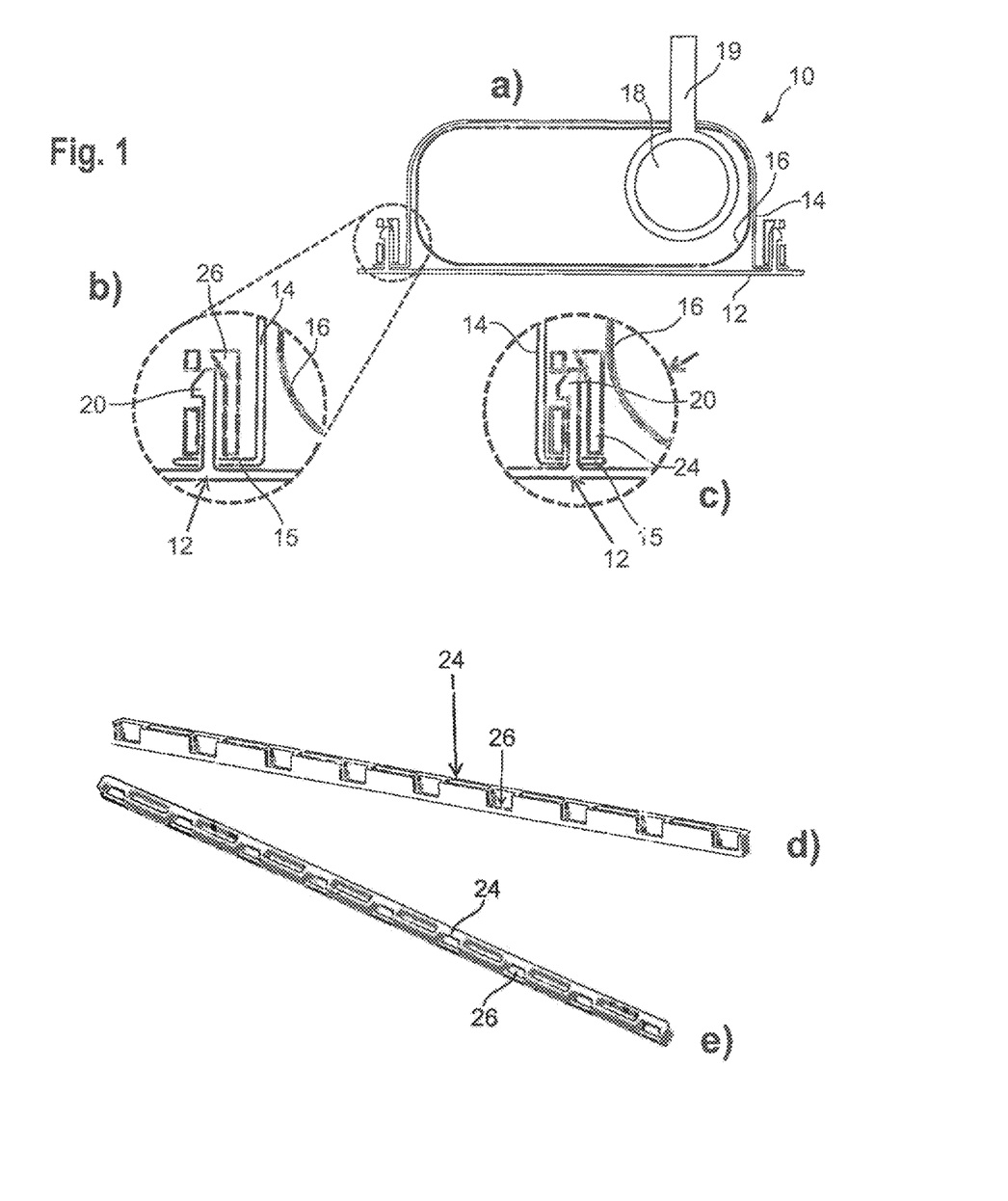
FIGS. 1a to 1e show in a schematic sectional view and, resp., in various detailed views an airbag module according to a first embodiment of the invention.

FIG. 1 schematically illustrates a section of an airbag module 10 including a cover 12 and a housing 14 arranged thereon. Inside the housing an airbag 16 (only schematically indicated here) is arranged in which in turn an inflator 18 schematically indicated here is arranged. The inflator 18 is provided with a bolt 19 by which it can be arranged on another component.

The cover 12 may be a separate component, for example a cover arranged on a steering wheel hub. In this case the inflator 18 would be arranged on a steering wheel hub by means of the bolt 19.

The cover 12 may also be part of a larger component on or behind which the airbag is disposed, for example an instrument panel. In this case the inflator 18 would be arranged on a carrier of the instrument panel by means of the bolt 19. Depending on the arrangement, a passenger airbag module or a knee airbag module may be concerned.

The cover 12 may also be part of an interior lining of a vehicle, for example part of the roof liner or a door covering or else part of a vehicle seat. In this case the inflator 18 would be disposed on a vehicle structure or a seat frame by means of the bolt 19.

Irrespective of the mounting situation, it is important that in the initial state the cover 12 covers the airbag 16 toward the vehicle interior and can be opened upon activation of the airbag so that the airbag deploys in the interior of the vehicle. For this purpose, the cover may be provided with predetermined breaking points or weakened zones, thus causing the cover 12 to be opened like a flap upon activation of the airbag 16, or the cover 12 may be of a multi-part design so that upon activation of the airbag the latter will exit between two neighboring parts of the cover.

Within the scope of the described embodiment it is not decisive, however, in which way the cover enables the airbag to exit. What is solely relevant is that the cover at least in portions has such strength that the housing 14 may be arranged on the same. The attachment has to be especially load-bearing so that the forces occurring upon activation of the airbag can be reliably absorbed. These forces are especially resulting from increase in pressure inside the airbag 16 before the latter has opened the cover 12 so that the airbag can deploy in the vehicle interior.

The housing 14 in this case is a fabric part, i.e. it is basically flexible, and at least to a major part encloses the airbag 16. Especially the housing 14 and, resp., the fabric part is designed to enclose the airbag 16 on all sides which are not covered by the cover 12. It is also imaginable, however, that for example on two end faces a solid wall is provided and that the fabric part 14 covers the airbag 16 "only" on the remaining two sides and on the rear side facing away from the cover.

For connecting the fabric part 14 to the cover 12 the cover 12 is provided with fastening means which, in the embodiment shown in FIG. 1, are in the form of a plurality of hooks 20 extending along at least two edges of the housing 14. As is evident especially from FIG. 2b, the hooks 20 are formed integrally with the cover 12, for example are injection-melded to the latter, and extend perpendicularly away from the cover 12 to the rear, i.e. to the side on which the airbag module 10 is arranged.

The fabric part 14 includes a fastening edge 15 provided with a plurality of breakthroughs each of which is associated with a hook 20. The fabric part 14 is arranged so that the breakthroughs are threaded onto the hooks 20. Subsequently a locking element, in this case in the form of an elongate strip 24, is attached to the hooks 20. The strip 24 includes for each hook 20 a receiving passage 26 in which the respective hook 20 may engage so that it is resiliency caught and locked there. In this way the fastening edge 15 of the fabric part 14 is reliably fixed between the locking element, namely the strip 24, and the cover 12.

Figure 2:
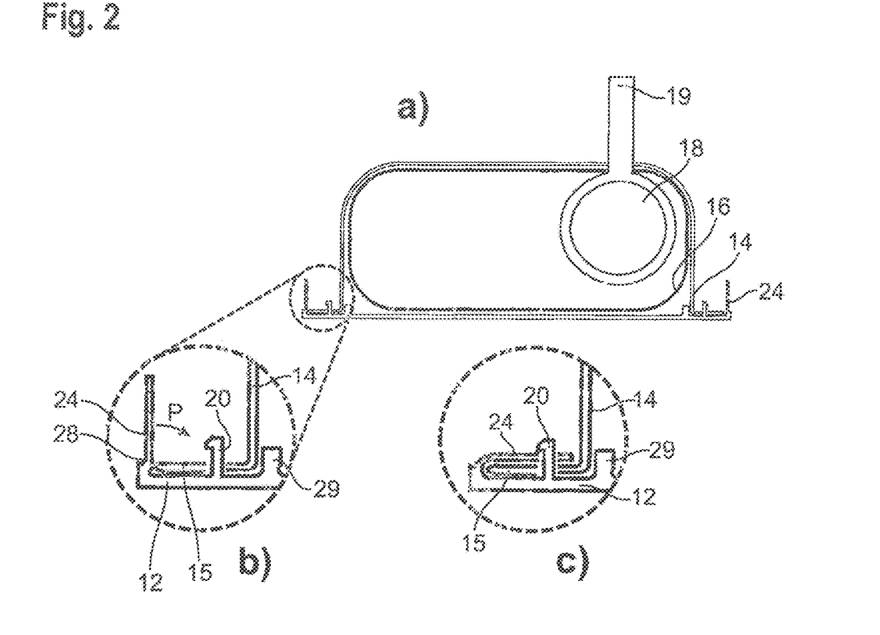
FIGS. 2a to 2c show in a schematic sectional view and, resp., detailed views an airbag module according to a second embodiment of the invention.

The locking element 24 may be arranged either outside the fabric part 14 as shown in FIG. 1b or else inside the housing (cf. FIG. 2c). Depending on the desired strength, the locking element may be made of plastic material or, possibly, also of metal.

In FIGS. 2a to 2c a second embodiment is illustrated. It differs from the first embodiment substantially by the configuration of the locking element. Whereas in the first embodiment a locking element 24 in the form of a separate component is used, in the second embodiment a tab-like locking element 24 is used which is integrally connected to the cover 12 via a hinge portion 28.

In the initial position (cf. FIG. 2b) the looking element is folded up so that the hook 20 is freely accessible. When the fastening edge 15 of the fabric part 14 has been threaded onto the hooks, the locking element 24 is folded down (see arrow P in FIG. 2b) so that it engages in the hook and is locked there. In this way, when being threaded onto the hooks 20, the fastening edge 15 of the fabric part 14 is retained between the locking element 24 and the cover 12.

The clamping effect is backed by a counter-bearing 29 (cf. FIGS. 2b and 2c) arranged adjacent to the hooks 20.

The locking element 24 may be designed in the form of individual tabs for each individual hook or else in the form of a continuous strip extending over all hooks.

In the first and second embodiments, the hooks may be basically arranged in an appropriate configuration on the cover 12, for instance in a row along two or more sides of the housing 14 or, if useful, may also follow a curved contour of the housing 14.

Figure 3:
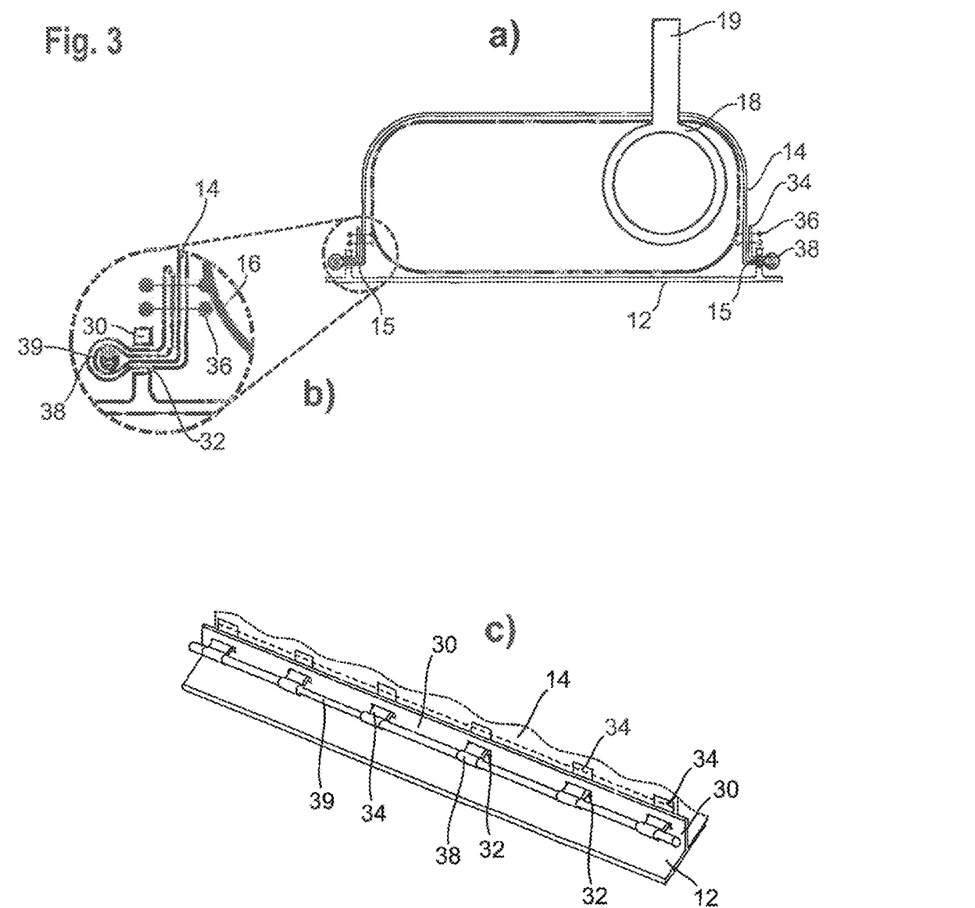
FIGS. 3a to 3c show in a schematic sectional view and, resp., in detailed views an airbag module according to a third embodiment of the invention.

In FIG. 3 a third embodiment is shown in which the fastening means are provided with plural openings. Concretely speaking, the fastening means in this case are in the form of a fastening strip 30 which is designed integrally with the cover 12 and extends approximately perpendicularly to the plane of the cover 12. In the fastening strip 30 plural silt-shaped openings 32 are juxtaposed at a distance from each other.

At the fastening edge of the fabric part 14 which forms the housing of the airbag module 10 there are provided plural tabs 34 each of which is stitched back onto the fastening edge by means of a seam 30 so that in each case an eye 38 is formed. Each of the eyes 38 is put through one of the openings 32 and a locking element 39 extends through the part of the eye 38 that has been put through. The locking element 39 extends along the fastening strip 30 in the type of a rod through all eyes 38 of the respective side of the fabric part 14. The locking element 39 prevents the eyes 38 from being drawn through the openings 32 in the fastening strip 30.

As is evident especially from the FIGS. 3a and 3b, the locking element 39 is provided outside the housing formed by the fabric part 14. Basically it is also possible, however, to turn round the arrangement so that the locking element is provided on the inside of the space defined between two opposed fastening strips 30.

The openings 32 in the fastening strip 30 are spaced apart from each other, as is especially evident from FIG. 3c, at a distance which is larger than the width of the openings themselves and also larger than the width of the eyes. In particular a distance larger than twice the width of the eyes and, resp., of the openings is used.

Figure 4:
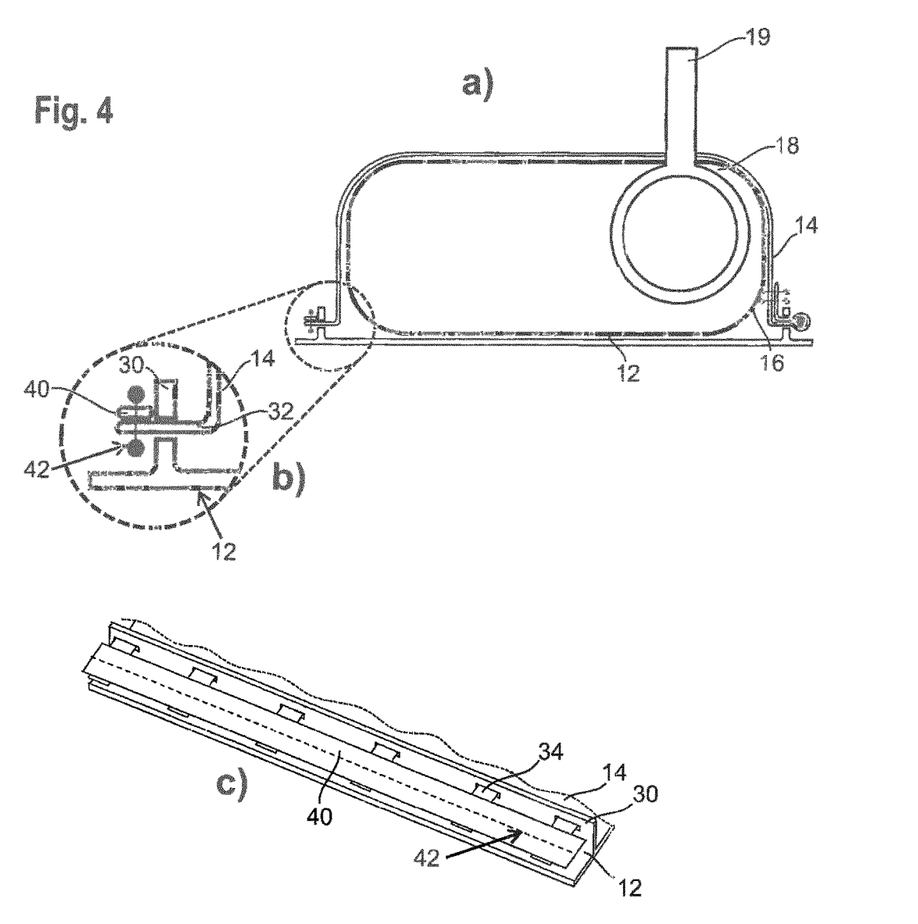
FIGS. 4a to 4c show in a schematic sectional view and, resp., in detailed views an airbag module according to a fourth embodiment of the invention.

FIG. 4 illustrates an embodiment in which, similarly to the third embodiment, a fastening strip 30 formed integrally with the cover 12 and provided with plural slit-shaped openings 32 is used as fastening means. Again tabs 34 forming part of the fastening edge 15 of the fabric part 14 are extending through the openings 32. Other than in the third embodiment, however, no eyes are formed in the fourth embodiment. Instead, a locking element which is constituted by a fabric part 40 sewn up with the tabs 34 is used.

As is evident especially from FIG. 4c, one single continuous fabric part 40 is employed and, accordingly, one single seam 42 is used which extends along the entire length of the fabric part 40 and, wherever a tab 34 is present, tightly connects the same to the fabric part 40. In this way a thickening (cf. especially FIG. 4b) preventing the tabs from being drawn out of the openings 32 is formed on the side of the tabs 34 being put through the openings 32.

As is visible from FIG. 4a, it is possible to make use of different types of fastening on different sides for fastening the housing 14. On the left side in FIG. 4a the fabric part 14 is fastened by arranging an additional locking fabric part 40, while on the opposite side the fastening including eyes and the locking rod as known from the third embodiment is employed. This is advantageous in that the fabric part 14 forming the housing first can be fastened to the cover 12 on the left side by means of the seam 40, then can be folded around the inflator 18 and the airbag 16 and after that can be fixed to the fastening strip 30 and thus to the cover 12 on the right side by means of the eyes 38 and the locking rod 39.

However, basically it is possible in all embodiments to combine different types of fastening.

Figure 5:
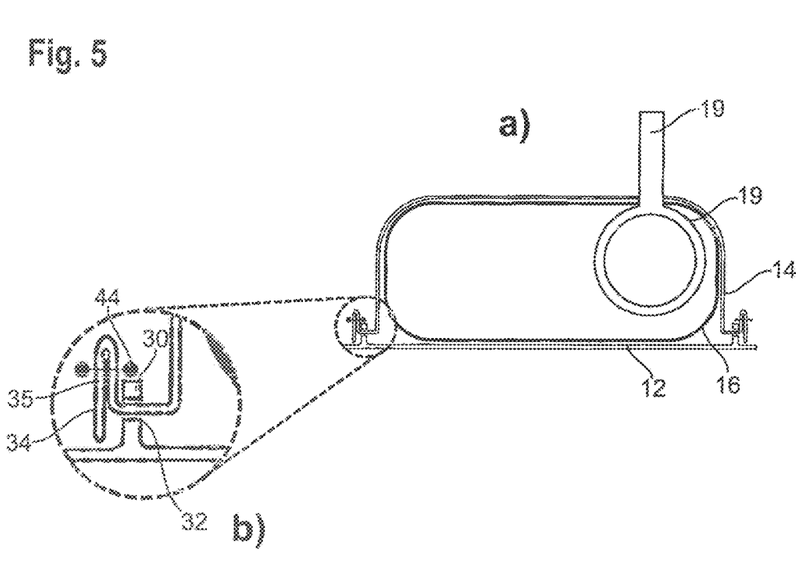
FIGS. 5a and 5b show in a schematic sectional view and a detailed view an airbag module according to a fifth embodiment of the invention.

FIG. 5 illustrates a filth embodiment which differs from the embodiment according to FIG. 4 in that the "thickening" on the outside of the fastening strip 30 is not formed by an additional fabric part but by a folded end portion of the tabs 34 of the fabric part 14 being put through the openings 32. Each of the end portions of the tabs 34 can be fixed to itself by an individual seam 44 so that it is no longer possible due to the material accumulation occurring in that case to withdraw the tabs 34 through the openings 32. In this way the fabric part 14 is reliably fixed to the fastening strips 30 and thus to the cover 12.

Figure 6:
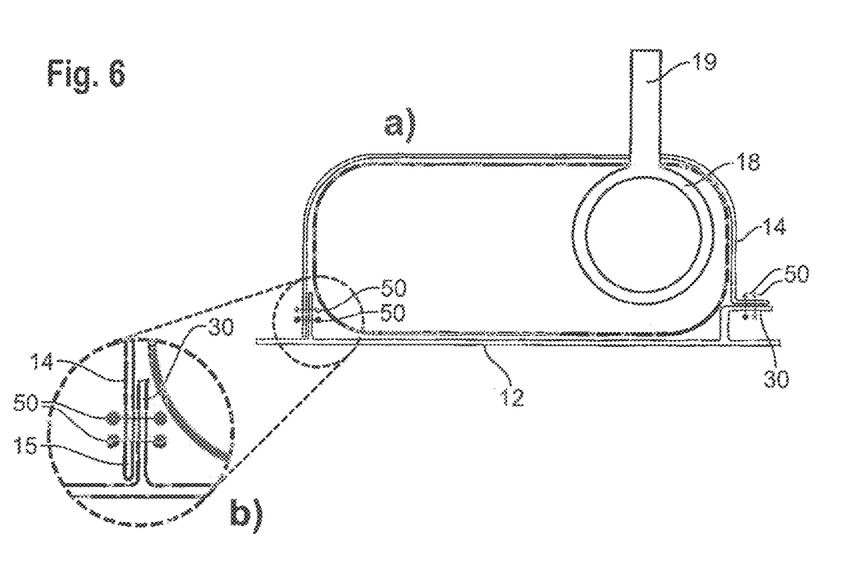
FIGS. 6a and 6b show in a schematic sectional view and in a detailed view an airbag module according to a sixth embodiment of the invention.

In FIG. 6 another embodiment is illustrated in which equally a fastening strip 30 and a seam are used for connecting the fabric part 14 to the cover 12. Other than in the fourth and fifth embodiments, in the sixth embodiment no openings are used in the fastening strip 30. Instead, the fastening edge 15 of the fabric part 14 is directly sewn up with the fastening strip 30 (see the seam 50 in FIGS. 6a and 6b).

Depending on the mounting conditions and the device used for producing the seam 50, the fastening strips 30 may be appropriately aligned relative to the cover 12. In FIG. 6a it is visible that the fastening strip 30 arranged on the left side extends perpendicularly to the cover 12. The fastening strip 30 arranged on the right side, on the other hand, is configured to be bent so that its free portion to which the fabric part 14 is stitched extends approximately in parallel to the cover 12.

Figure 7:
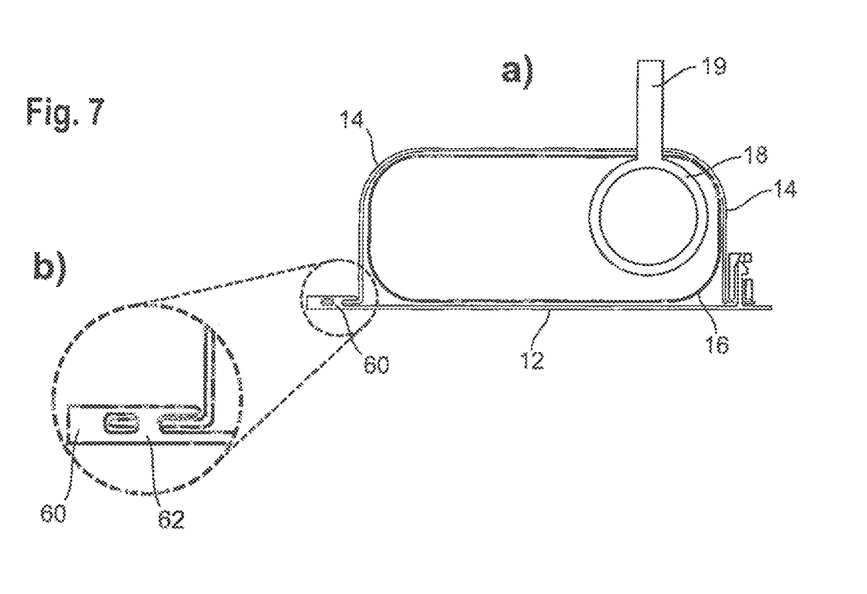
FIGS. 7a and 7b show in a schematic sectional view and in a detailed view an airbag module according to a seventh embodiment of the invention.

FIG. 7 illustrates a seventh embodiment in which the fastening means are formed by a block-type bearing portion 60, i.e. by a local material accumulation on the cover 12 into which the fabric part 14 is directly embedded. Hence the fabric part 14 is injected directly into the material of the cover so that a tight reliable connection is resulting between the material of the cover and the fastening edge 15 of the fabric part 14. The fabric part may be provided with openings through which material bridges 62 of the bearing portion 60 extend so that, apart from the embedding of the fastening edge 15, also a positive connection is established between the bearing portion 60 and the fabric part 14.

As is visible from FIG. 7a, the fabric part 14 is reasonably injected into the cover 12 on one side only. On the other side any one of the types of fastening known from the embodiments 1 through 6 may be used for attaching the fabric part 14 to the cover 12, after the airbag 16 and the inflator 18 have been arranged inside the fabric part 14.

Figure 8:
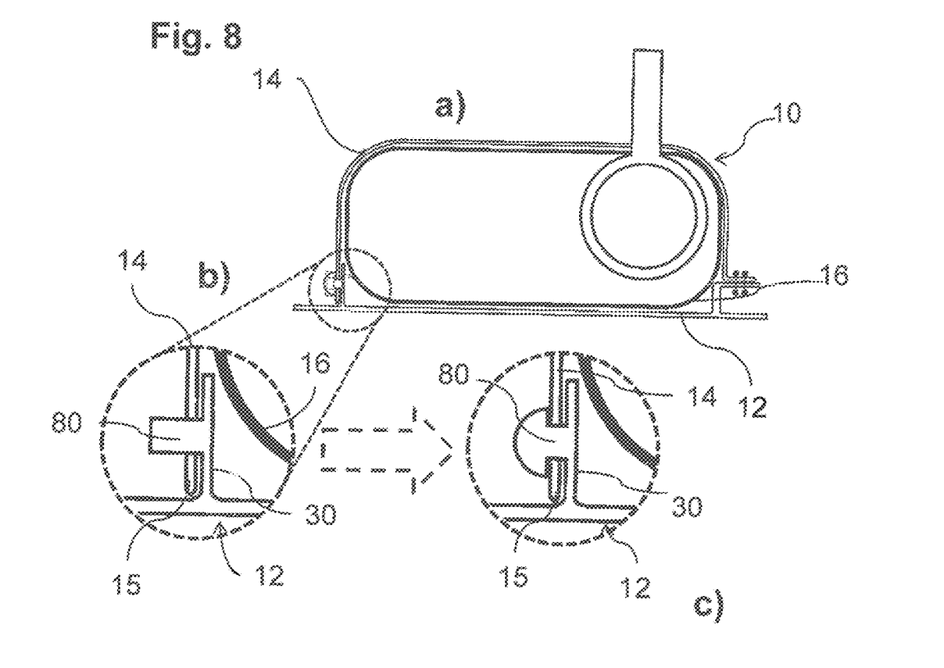
FIGS. 8a to 8c show in a schematic sectional view and, resp., in detailed views an airbag module according to an eighth embodiment of the invention.

In FIGS. 8a to 8c an eighth embodiment is illustrated. It differs from the sixth embodiment substantially by the configuration of the connection between the fastening strip 30 and the fastening edge 15 shown on the left side of the picture in FIG. 8a.

The fastening edge in said eighth embodiment includes a number of dome-shaped extensions 80 projecting outwardly from the fastening edge 15. In the initial position (cf. FIG. 8b) the fastening edge provided with appropriate openings for this purpose is threaded onto said dome-shaped extensions 80. After the fastening edge 15 of the fabric part 14 has been threaded onto the dome-shaped extensions 80, they are expanded mushroom-like by plastic reforming at their free ends so that the fabric edge is secured against slipping off the extensions (cf. FIG. 8c). The dome-shaped extensions 80 (welding domes) are reformed by fusing, for example by suitable thermal processes known per se by means of ultrasound, hot air, electrically heatable mandrel frictionwelding, mirror-welding or other suitable processes.

The connection shown on the right side of the picture in FIG. 8a between the fastening edge and the fastening strip is established by a seam analogously to the embodiment accenting to FIGS. 6a to 6c.

In all embodiments the cover is preferably made of plastic material. It may especially be an injection-molded part.

The invention claimed is:

1. An airbag module comprising a housing (14) for an airbag (16) and a cover (12), the housing including a fabric part (14) which at least partly encloses the airbag (16), wherein a strip (30) for fastening the housing (14) is formed integrally with the cover (12), wherein the fabric part (14) is arranged directly on the fastening strip (30), and wherein the fabric part (14) is sewn to the fastening strip (30).

2. The airbag module according to claim 1, wherein the fastening strip (30) extends continuously along one side of the housing (14).

3. The airbag module according to claim 1, wherein the fabric part (14) is connected to the fastening strip (30) via extensions (80) arranged on said fastening strip (30) which are expanded at their ends.

4. The airbag module according to claim 3, wherein the expanded extensions (80) are in the form of welding domes.

5. The airbag module according to claim 4, wherein the welding domes have a first, expanded condition for receiving the fabric part and a second, flattened condition preventing disconnection of the fabric part from the welding domes.

6. The airbag module according to claim 3, wherein on one side the fabric part (14) is sewn up with the fastening strip (30) and on another side it is connected to a second fastening strip (30) via expanded extensions (80) arranged on said second fastening strip.

7. The airbag module according to claim 1, wherein the fabric part is sewn to the fastening strip such that a seam extends through both the fabric part and the fastening strip.

8. The airbag module according to claim 1, wherein the fabric part is sewn directly to the fastening strip.

9. The airbag module according to claim 1, wherein the fastening strip extends parallel to the cover.

10. An airbag module comprising:
   a housing for an airbag including a fabric part for at least partially surrounding the airbag; and
   a cover for enclosing the airbag within the housing and including at least one integrally formed fastening strip for securing directly to the fabric part by at least one sewn connection extending through both the fastening strip and the fabric part.

11. The airbag module according to claim 10, wherein the at least one fastening strip comprises:
   a first fastening strip secured directly to a first portion of the fabric part by a sewn connection; and
   a second fastening strip secured directly to a second portion of the fabric part by expanded extensions integrally formed with the second fastening strip.

12. The airbag module according to claim 11, wherein the expanded extensions comprise welding domes having a first, expanded condition for receiving the second portion of the fabric part and a second, flattened condition preventing disconnection of the second portion of the fabric part from the welding domes.

13. The airbag module according to claim 11, wherein the first and second fastening strips are positioned on opposite sides of the housing.

14. The airbag module according to claim 10, wherein the at least one fastening strip comprises:
   a first fastening strip secured directly to a first portion of the fabric part by a first sewn connection; and
   a second fastening strip secured directly to a second portion of the fabric part by a second sewn connection.

15. The airbag module according to claim 14, wherein the first and second fastening strips are positioned on opposite sides of the housing.

16. The airbag module according to claim 10, wherein the fastening strip extends parallel to the cover.

17. The airbag module according to claim 10, wherein the sewn connection is exposed on an outer side of the fastening strip.

18. The airbag module according to claim 10, wherein the at least one fastening strip comprises:
   a first fastening strip secured directly to a first portion of the fabric part by a first sewn connection; and
   a second fastening strip secured directly to a second portion of the fabric part by a second sewn connection, the first and second fastening strips extending perpendicular to one another.

* * * * *